June 2, 1959  C. R. MEISSNER  2,889,239
METHOD FOR MAKING A TRANSPOSED CONDUCTOR STRUCTURE
Filed March 12, 1958  3 Sheets-Sheet 2
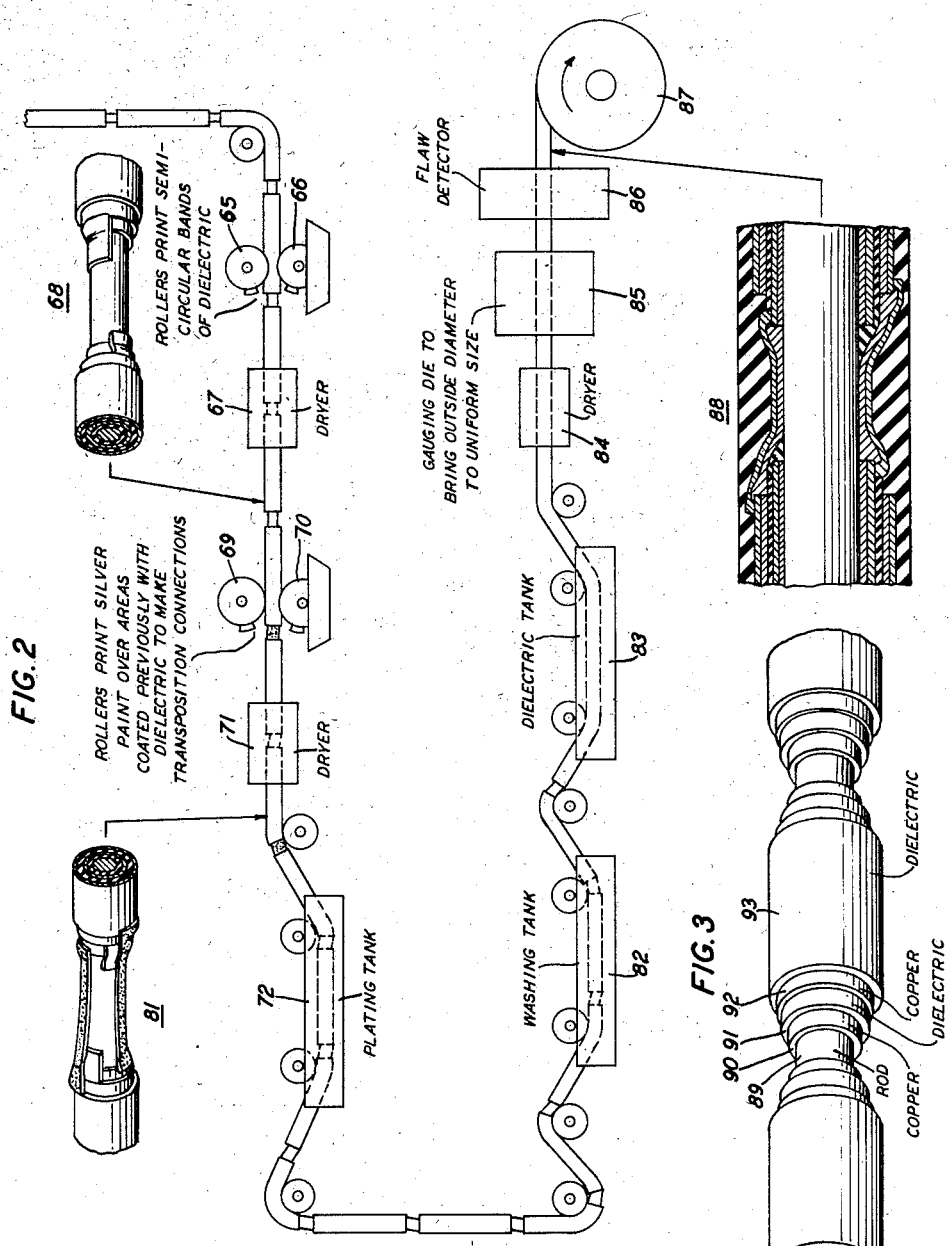
INVENTOR
C. R. MEISSNER
BY John C. Morris
ATTORNEY

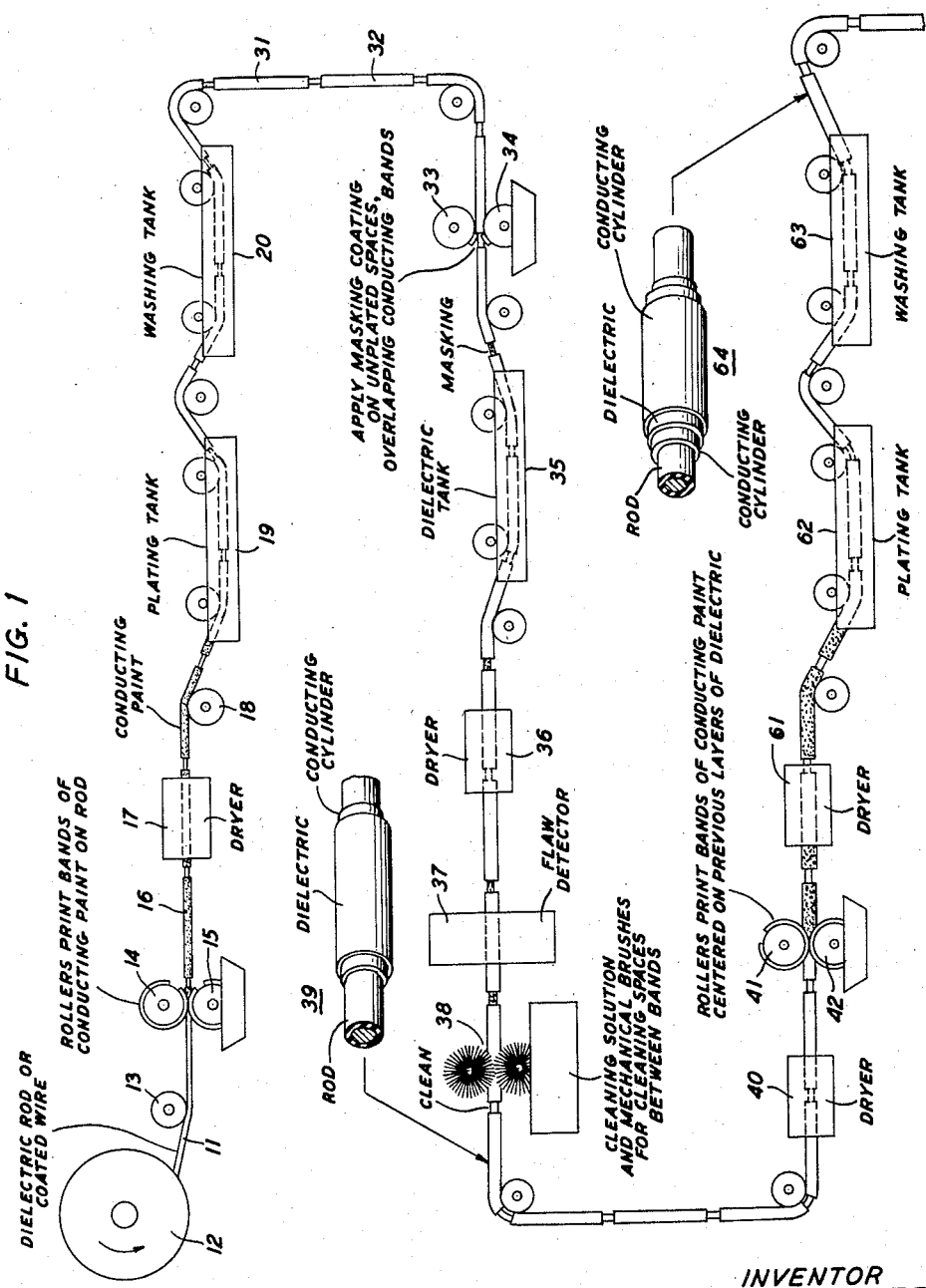

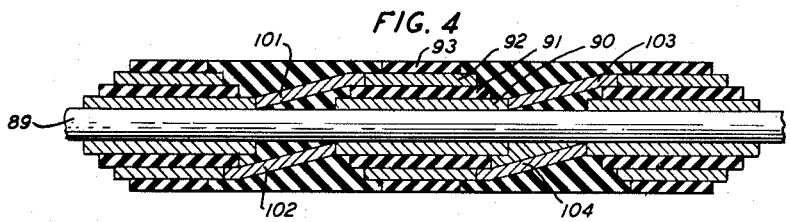
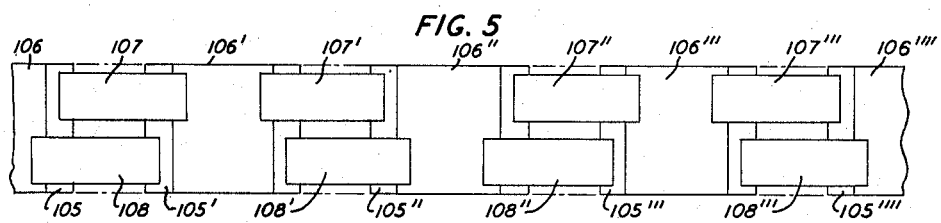
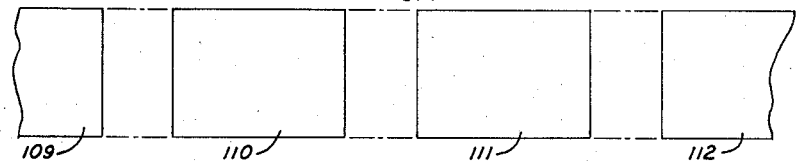
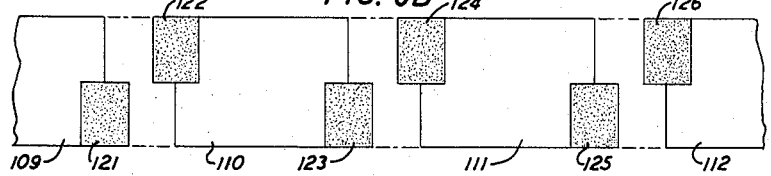
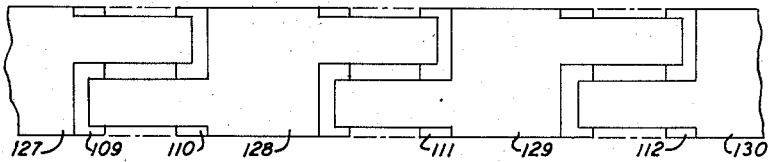
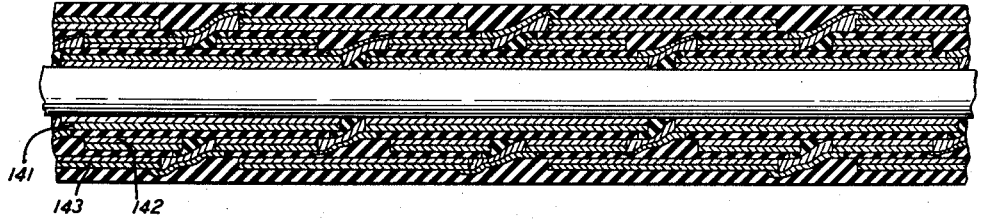

United States Patent Office 2,889,239
Patented June 2, 1959

2,889,239

METHOD FOR MAKING A TRANSPOSED CONDUCTOR STRUCTURE

Charles R. Meissner, Chatham, N.J., assignor to Bell Telephone Laboratories, Incorporated, New York, N.Y., a corporation of New York Application March 12, 1958, Serial No. 720,935

5 Claims. (Cl. 117—212)

This invention relates to methods for making electrical transmission line structures and is a continuation-in-part of applicant's prior copending application Serial No. 366,491, filed July 7, 1953, now abandoned.

As set forth in United States Patent 2,812,502 to W. H. Doherty, issued November 5, 1957, and filed on July 7, 1953, concurrently with applicant's prior copending application, the alternating current resistance of a high frequency cable may be substantially reduced by the use of a coaxial conductor which is made up of a plurality of laminated coaxial conducting cylinders which are insulated from one another and periodically transposed. Despite the substantially improved electrical properties of this type of transmission line, it was at first considered impractical because it was believed that its fabrication would require a number of distinct machining and assembly or other complex manufacturing operations which would make the completed structure prohibitively expensive.

Accordingly, the principal object of the present invention is to make a laminated transposed coaxial conductor structure by a process suitable for mass production or continuous operation.

Although some of the individual method steps which are suitable for a continuous process, such as electroplating a conductively painted core, are shown in the prior art, no method for fabricating the present type of complex laminated conductor structure was available. Concerning the nature of the complex conductor structure, a substantial problem was that of interconnecting inner and outer conducting laminations in successive transposition sections while insulating the laminations from one another.

A collateral object of the invention is, therefore, to make transposition connections between successive sets of insulated conducting laminations in a continuous process.

In accordance with the invention, longitudinally spaced sections of an elongated core having a dielectric surface are successively coated with layers of conducting and insulating material, and transpositions between the different conducting layers are made at the spaces between the longitudinally spaced conductively coated core sections. More specifically in accordance with one method shown in the drawings to illustrate the principles of the invention, a masking coating is employed to prevent the dielectric coating from adhering to the conducting layers at the transposition points so that the transposition connections may be made as part of the continuous process.

Other objects and certain features and advantages of the invention will be developed in the course of the detailed description of the drawings. In the drawings:

Figs. 1 and 2 constitute a process diagram showing the method steps involved in the construction of the cable in accordance with the invention;

Fig. 3 illustrates the laminated cable structure in an intermediate stage of construction;

Fig. 4 is a cross-sectional illustration of a completed section of the cable;

Fig. 5 is a diagram illustrating the transpositions between concentric conducting elements of the cable;

Figs. 6A, 6B and 6C are diagrams which illustrate an alternative mode of construction of the cable; and Fig. 7 is a cross-sectional view of a cable having three concentric conducting laminations.

Fig. 1 shows by way of example a flow chart for the continuous fabrication of the laminated cable structure. The general mode of construction required periodically coating a dielectric rod with spaced cylinders of conducting material. Successive layers of dielectric and a suitable conducting material such as copper are superposed on the basic spaced conducting cylinders, with each successive layer of copper dielectric being slightly shorter than the previous one to permit making the required transposition connections. The spacing of the transposition connections should be relatively small as compared to one-quarter of the propagation wavelength $\lambda_p$ of the signal to be transmitted down the cable. The distance between adjacent conducting bands should be as physically small as reasonable to permit the connection to be made.

Proceeding to a detailed consideration of Fig. 1, a filament like dielectric rod or coated wire 11 is unrolled from the reel 12 over a guiding roller 13 through the pair of painting rollers 14 and 15. These rollers paint conducting paint such as silver paint on the dielectric rod 11 in the form of spaced cylinders 16. From the conducting rollers, the dielectric rod passes through the dryer 17, a guide roller 18, and into the plating tank 19. In the plating bath, a thin layer of copper is plated onto the spaced cylinders of silver paint. From the plating tank 19, the cable structure is guided into the wash tank 20. Upon emerging from the wash tank, the cable now has its first set of spaced conducting cylinders 31 and 32 which will ultimately form the innermost conducting layer of the cable. The rollers 33, 34 apply a masking coating on the unplated surface between the conducting bands and slightly overlapping the ends of the bands to insure proper coverage of dielectric in the following step of the process. When subsequently covered with a dielectric and subjected to a bath and scrubbing action, the masking coating should separate from the core and carry with it the overlaying dielectric. Any coating that is capable of performing this function may be used in the process. A worker skilled in the art is familiar with a number of masking coatings which will satisfy these requirements. A water soluble plastic found to be particularly successful as a coating is a mixture of 92.3 parts by weight of fine particles of ground mica having a particle size of 5 to 10 microns; 7.7 parts by weight of sodium carboxy methyl cellulose; and sufficient water to make a paste of suitable application consistency. An example of ground mica found to be satisfactory is Micro-Mica C–3000 manufactured by the English Mica Company, Stamford, Connecticut, and a sodium carboxy methyl cellulose found to be satisfactory is that sold under the trade name CT by the Hercules Powder Company, Wilmington, Delaware. Following this coating the core is then fed through the dielectric tank 35, a dielectric dryer unit 36 and a flaw detector 37.

Although the dielectric coating process has been shown as a conventional bath 35, this step may in practice be performed in a somewhat more refined manner. In one test run, for example, the core was drawn vertically upward through four successive coating baths of liquid polystyrene with each bath being sufficiently shallow so as not to dissolve the preceding coat. A dryer was interposed at each stage. One embodiment of the insulation flaw detecting element 36 consists of a bath of saline solution through which the core passes with a voltage potential maintained between the core and bath. When a fault occurs, the current flow thus established to the core is used to raise the level of a sealing agent in a subsequent bath, so that it will come in contact with the core normally passing above it.

After the flaw detection stage 37, the core, now coated with successive layers of conducting material and dielectric, is passed through a cleaning operation 38 to remove all dielectric overlying the bands of masking coating which were applied by the rollers 33, 34. A complete set of isolated copper cylinders, one of which is shown at 39, have now been deposited on the dielectric rod and coated with a complete coating of dielectric with the exception of a narrow margin at either end of each conducting cylinder. After the cleaning stage 38, the conductor structure passes through the dryer 40 to the rollers 41, 42, which print additional bands of conducting paint centered on the previous layers of dielectric. The conducting structure now follows much the same process as noted above, e.g., it passes through the dryer 61, the plating tank 62, and the washing tank 63. As illustrated at the enlarged view of a portion of the cable structure shown at 64, two overlapping cylindrical laminations separated by a layer of dielectric have been built up at successive points along the dielectric rod. Referring now to a continuation of the process of Fig. 1 in Fig. 2, the rollers 65, 66 print semi-circular bands of dielectric bridging from the dielectric layer over the exposed edge of the inner conducting layer to the dielectric rod. An enlarged view of the cable after this operation and the drying procedure 67 is shown at 68. The rollers 69, 70 now print silver paint centered on the areas previously coated with dielectric to make transposition connections between outer and inner cylindrical laminations of successive sets of conducting laminations on the cable. The cable is then passed through the drying operation 71 and then to plating tank 72. An enlarged view of the cable shown after the drying operation 71 is shown at 81. After the plating operation 72, the cable structure passes through the washing tank 82, and a dielectric tank 83 where a uniformly thick coating of dielectric is applied to the conductor structure. After the last coating of dielectric is applied to the conductor structure and is hardened in passing through the dryer 84, the gauging die 85 reduces the outside diameter of the cable structure to a uniform size, the cable is subjected to a final flaw detection stage 86, and is wound up on the reel 87. An enlarged cross-sectional view of the completed cable structure is shown at 88.

Figs. 3 and 4 illustrate respectively a cable structure before and after transpositions between successive sets of laminated conducting cylinders have been made. Referring to the cross section of Fig. 4 and proceeding from the center outwardly, the structure is made up of the central dielectric rod or coated wire 89, the inner copper cylindrical lamination 90, the inner cylindrical layer of dielectric material 91, the next copper lamination 92, and the outer layer of dielectric material 93. Referring to Fig. 4, the transposition elements 101, 102, 103 and 104 which connect the cylindrical conducting laminations with the next adjacent section of cylindrical laminations may be seen. Furthermore, it may be noted that the transposition is always from an outer conducting layer of one set to an inner conducting layer of the next following set of conducting cylinders and from an inner layer of one set to an outer layer of the next following set.

Fig. 5 is a schematic diagram of the laminated conductor structure in which the elements 105 represent the inner conducting laminations of each set, the elements 106 represent the outer conducting laminations of each set and in which the transpositions between successive inner and outer laminations are effected by means of the conducting strips 107 and 108. The schematic view of Fig. 5 may thus be considered to be an unrolled view of the laminations and transposition elements of the conductor structure of Fig. 4.

Figs. 6A, 6B and 6C illustrate schematically a simplified version of the process of Figs. 1 and 2. In Fig. 6A the solid rectangles 109, 110, 111 and 112 represent the inner conducting laminations and correspond roughly to the elements 105 of Fig. 5. In Fig. 6B, the shaded areas 121 through 126 represent areas to which masking coating has been applied. The surface is then coated with dielectric material and a subsequent cleaning operation bares the areas 121 through 126. As shown in Fig. 6C, after the coating dielectric material has been affixed to the entire surface except those areas indicated as shaded in Fig. 6B, the outer conducting laminations 127 through 130 are applied to the conducting structure. This obviates a number of the method steps shown in Figs. 1 and 2 by combining the application of the outer conducting layer with the application of the transposition strips rather than by accomplishing these two coating steps separately.

While the foregoing description has been in terms of a laminated structure having two conducting layers, it is to be understood that structures having many more layers may be readily constructed using essentially the same method. As an example of the use of a greater number of conducting layers, Fig. 7 represents a laminated conductor structure in which three layers 141, 142 and 143 are employed rather than the two conducting layers illustrated in Figs. 1 through 6. Although slightly more complicated than the above noted two-lamination structures, multilayer composite conductors such as the three-lamination structure of Fig. 7 may be manufactured in a manner very similar to that set forth in conjunction with Figs. 1 and 2. Specifically, the method of construction is very nearly self-evident from the completed structure of Fig. 7 with the successive layers of conducting and insulating material being built up by banding and electroplating conducting material and by coating with dielectric material as set forth hereinabove.

It is to be understood that the above-described arrangements are illustrative of the application of the principles of the invention. Numerous other arrangements, such as the use of other types of conducting and insulating materials, may be devised by those skilled in the art without departing from the spirit and scope of the invention.

What is claimed is:

1. A continuous process for making a transposed conducting structure comprising the steps of coating an elongated core having a dielectric surface with successive inner conducting bands having uncoated spaces between said bands, coating each of said inner conducting bands with a dielectric band slightly shorter in length than said conducting bands, coating each of said dielectric bands with an outer conducting band slightly shorter than said dielectric bands, said outer conducting and dielectric bands being centrally positioned on the underlying dielectric and inner conducting bands, respectively, applying an insulating coating bridging the exposed edges of the inner conductive band from the dielectric contiguous to each exposed edge thereof to the elongated core, applying a conductive coating over said insulating coating and joining the inner and outer conductive bands, and continuously moving said core while each of the foregoing operations is being performed.

2. In a continuous process for making a coaxial conductor structure, the steps of coating an elongated core having a dielectric surface with a first layer of longitudinally spaced sections of conducting material, coating portions of said conducting sections adjacent the spaces between said sections with a masking material, coating the entire surface of said core with dielectric material, removing the masking material and the overlaying dielectric material, coating the core with a second layer of spaced sections of conducting material which substantially overlie but are slightly shorter than said first sections of conducting material, the second layer of conducting material being centrally positioned on the underlying dielectric material, applying an insulating coating bridging the exposed edges of the inner conductive bands from the dielectric contiguous to each exposed edge thereof to the elongated core, applying a conductive coating over the bridging and joining the first and second conducting layers, said coating being of a peripherally extent less than that of the bridging, and continuously moving said core while each of the foregoing operations is being performed.

3. A continuous process for making a transposed coaxial conductor structure comprising the steps of roller painting bands of conducting paint on said filament, said bands being separated by unplated spaces, passing said filament through a plating tank and plating additional conducting material on said painted areas, applying dielectric masking material on the unplated spaces between and overlapping said conducting bands, passing said filament through a tank of dielectric material and thereby applying a coat of dielectric material to the filament, removing the dielectric material from the spaces between said conducting bands by washing and mechanical brushing means and leaving bands of dielectric material centered on said conducting bands, roller painting additional bands of conducting paint centered on and slightly shorter than said bands of dielectric material, passing said filament through another plating tank and plating additional conducting material on said last-mentioned bands of conducting paint, painting semicylindrical bands of dielectric material over the exposed ends of said inner conducting bands between the layer of dielectric material and the dielectric filament, painting conducting paint over the semicylindrical bands of dielectric material and making contact with alternate inner and outer conducting bands, and passing said filament through a plating tank and plating conducting material on said painted areas.

4. A continuous process for making a coaxial cable comprising longitudinally spaced sections with conductor transposition zones therebetween, that comprises continuously translating a dielectric surfaced cylindrical core in the direction of its axis, securing a longitudinal discontinuous inner conductive coating to said core to form spaced conductive sections, securing to each conductive section a dielectric coating and to each dielectric coating an outer conductive coating each of which is longitudinally set back at each end from the coating thereunder, coating diametrically opposite semicylinders of the exposed portions of contiguous ends of each first conductive coating with insulation, applying a semicylindrical conductive coating to each remaining exposed end of the first conductive coating and extending this coating over the semicylinder of insulation on the contiguous first conductive coating to the contiguous exposed ends of the second conductive coating, and applying a continuous dielectric coating over all.

5. A continuous process for making a coaxial cable comprising spaced longitudinal sections with conductor transposition zones therebetween, that comprises continuously translating a dielectric surfaced cylindrical core in the direction of its axis, applying a longitudinally discontinuous conductive layer to said core to form spaced conductive sections, applying masking means to contiguous ends of the conductive layer of each section and to the zones therebetween, applying a continuous layer of dielectric material over all, removing those portions of the dielectric layer over the masking means along with said means leaving a discontinuous dielectric layer, the ends of each section of which are set back from the ends of the underlying conductive layer, applying another discontinuous conductive layer to said sections so that the ends of the sections of this conductive layer are set back with respect to the underlying dielectric layer, applying separated substantially semicylindrical layers of dielectric material over diametrically opposite sides of contiguous ends of the set-out portions of the inner conductive layer of each section, applying a substantially semicylindrical layer of conductive material over the last applied dielectric layer of each longitudinal section to connect the inner and the outer conductive layers of contiguous sections, and applying a continuous dielectric layer over all.

References Cited in the file of this patent

UNITED STATES PATENTS

| 2,115,761 | Blumlein | May 3, 1938 |
| 2,684,993 | Bowers | July 27, 1954 |

FOREIGN PATENTS

| 272,407 | Great Britain | June 16, 1927 |

OTHER REFERENCES

"New Advances in Printed Circuits," 1948, Nat. Bur. of Stds., Misc. Pub. 192.